United States Patent
Ma et al.

(10) Patent No.: US 7,881,186 B2
(45) Date of Patent: Feb. 1, 2011

(54) METHOD ABOUT PROTECTING HIGH LAYER SERVICE IN THE MULTILAYER COMMUNICATION EQUIPMENT

(75) Inventors: Huan nan Ma, Shenzhen (CN); Qing Li, Shenzhen (CN); Min Zhu, Shenzhen (CN); Pei hua Zhang, Shenzhen (CN); Nan xi Su, Shenzhen (CN)

(73) Assignee: ZTE Corporation, Guangdong Province (CN)

( * ) Notice: Subject to any disclaimer, the term of this patent is extended or adjusted under 35 U.S.C. 154(b) by 861 days.

(21) Appl. No.: 10/522,057

(22) PCT Filed: Jul. 17, 2003

(86) PCT No.: PCT/CN03/00573

§ 371 (c)(1),
(2), (4) Date: Apr. 25, 2005

(87) PCT Pub. No.: WO2004/010644

PCT Pub. Date: Jan. 29, 2004

(65) Prior Publication Data

US 2005/0220141 A1    Oct. 6, 2005

(30) Foreign Application Priority Data

Jul. 24, 2002    (CN) .................................. 02 1 36261

(51) Int. Cl.
*H04L 1/00* (2006.01)
(52) U.S. Cl. ...................... 370/217; 370/221; 370/225; 370/242
(58) Field of Classification Search ................ 370/216, 370/217, 218, 219, 221, 222, 225, 241, 242, 370/248, 395.1, 397, 399, 400, 409, 469
See application file for complete search history.

(56) References Cited

U.S. PATENT DOCUMENTS

| | | | |
|---|---|---|---|
| 5,469,428 A | | 11/1995 | Tokura et al. |
| 5,627,836 A | * | 5/1997 | Conoscenti et al. ......... 370/397 |
| 5,793,746 A | | 8/1998 | Gerstel et al. |
| 5,974,027 A | | 10/1999 | Chapman |

(Continued)

FOREIGN PATENT DOCUMENTS

| | | |
|---|---|---|
| CN | A-1141105 | 1/1997 |
| CN | A-1208526 | 2/1999 |

*Primary Examiner*—Ricky Ngo
*Assistant Examiner*—Wei-Po Kao
(74) *Attorney, Agent, or Firm*—J.C. Patents

(57) ABSTRACT

This invention relates to a method for protecting high layer service in the multi-layer communication equipment, include that low layer processing module which provides low layer transmission passages for high layer processing module, and high layer processing module which sets up transparent VP link passage from up and down node by the service of said module, in order to make the service processed by the said module avoid influence. Once detecting the fault of the said processing module, high layer processing module will message the low layer processing module, and the low layer processing module will set up bypass connection after detecting the fault of the high layer processing module, then isolate the failed high layer process module. According to the present invention, extra network passages are not necessary, the means of protecting network is not limited. The present invention aims to protect effectively ATM traffic when the processing ability of ATM layer invalidate between MSPP and MSTP. The present invention solves the problem that will influence the other node of the network beyond the said node service in the case of device maintenance.

8 Claims, 2 Drawing Sheets

Node a      Node b      Node c

ATM     SDH

U.S. PATENT DOCUMENTS 6,081,529 A * 6/2000 Christie .................. 370/395.2
6,195,704 B1 2/2001 Suita
6,633,566 B1 * 10/2003 Pierson, Jr. ............. 370/395.1
2001/0046206 A1 * 11/2001 Chan et al. .................. 370/222
2002/0162045 A1 * 10/2002 Shiragaki ....................... 714/4
2005/0185576 A1 * 8/2005 Sugawara et al. ........... 370/216

* cited by examiner

METHOD ABOUT PROTECTING HIGH LAYER SERVICE IN THE MULTILAYER COMMUNICATION EQUIPMENT

TECHNICAL FIELD

This invention is related with a method for protecting high layer service in multi-layer communication equipment, especially with the method to provide bypass connection protecting ATM (Asynchronous Transfer Mode) service in MSPP (Multi-Service Provisioning Platform) and MSTP (Multi-Service Transport Platform).

BACKGROUND TECHNOLOGY

Usually, the protection for the communication network service is realized by using alternative routes of the same layer in the communication equipment, e.g. automatic protection switch of SDH and ATM (reference to ITU-T G.841 and I.630). Such protection is characterized with providing two passages (SDH channels or ATM VPC/VCC) on the same layer of communication equipment, namely working passage and protecting passage. Commonly, working passage transmits service, when there are some problems with working passage, protecting passage will transmit service, and the switch between working passage and protecting passage is realized by the node adjacent to the malfunction position or the node influenced by malfunction. However, there need many nodes involved to realize protection step, even need some relevant nodes coordinate, therefore, it is complicated to realize, thus influence its efficiency and stability.

In the MSPP, ATM traffic are provided by ATM processing module which has the following main functions: to drop ATM traffic from other nodes of sub-network to said node; to add ATM traffic from said node to other nodes on sub-network. As a matter of fact, the ATM traffic processing module of certain node doesn't process the ATM traffic between other nodes of sub-network. As a function module, ATM processing module only lose its function of adding and dropping the ATM traffic, instead of influencing service between other nodes. There are some similar problems in other multi-layer network equipment. Therefore, if traditional ATM traffic protection method is adopted, the ATM processing module and SDH processing module in MSPP are treated as two independent devices, which result in failure of making full use of the advantage of combination of each other.

INVENTION DISCLOSURE

The technical problem that the invention wants to solve is that many nodes are needed to participate in the protection operation in communication network, it provide a method for protecting ATM traffic in MSPP as well for protecting other high layer service in multi-layer communication equipment.

The invention describes a method for protecting high layer service in multi-layer communication equipment, which comprises of the following processing steps:

First, low layer processing module provides high processing module with low layer transmission passage;

Second, high layer processing module extracts and inserts high layer service of the said node from low layer transmission passage, avoiding changing the service between upstream node and downstream node after passing high layer processing module of the said node; with regard to ATM traffic, a cross connection, hereinafter called transparent connection, which changes neither virtual path identification nor virtual channel identification will be set up.

Third, after high layer processing module detecting the said module encountering the trouble, it will inform low layer processing module by software messages or hardware signals;

Fourth, a bypass will be set up after low layer processing module detecting high layer processing module encountering the trouble, so as to isolate the effected high layer processing module.

Said situation that low layer processing module detect high layer processing module encountering trouble further comprises to judge whether the service signal transmitting by high layer processing module is invalid or not, or to detect the hardware signals or software messages sending by high layer processing module indicating its invalidation; said bypass connection is actual connection of the physical lines, or it is logical connection within low layer processing module (such as the SDH bypass in MSPP).

There is neither need to establish complicated network passage nor limitation for the protection method of group network to adopt said method in the invention. The invention aims at providing improved protection for ATM traffic in case of the fault of processing function of ATM layer in the MSPP and MSTP. The invention solves the problem that device maintenance influences other nodes' service passing said node. Meanwhile, in the invention protection operation is accomplished in the malfunctioned node, which means it only influences service around said node. If many nodes encounter troubles at the same time, protection can be operated respectively to each malfunctioned node without influence among each other. Compared with prior art, the method in the invention can optimize network device, save device cost, simplify operation and increase operation efficiency. Furthermore, the invention can isolate multi-point malfunction in order to operate service protection efficiently. The invention can be used to protect high-layer service through low-layer process module in other multi-layer network service and alternate high-layer service process module without stopping other nodes' service passing said node.

DRAWING DESCRIPTION

SPECIFIC EMBODIMENT

The following is the further concrete description for the embodiment in the invention with reference to the drawings and the application of ATM traffic protection in MSPP based on SDH.

MSPP based on SDH has function of standard SDH transmission node as well as the plug-in function of ATM traffic, wherein ATM traffic is received by plugs of ATM process module and SDH service transmission is operated by interface of SDH process module. SDH process module transmits the received SDH passage from upstream corresponding to ATM traffic to ATM process module, while ATM process module add local ATM traffic Therefore, after the multipex, the local ATM traffic and ATM traffic transmitted from upstream to downstream will be mapped in the SDH passage and transmit to SDH process module for sending downstream.

Figure 1:
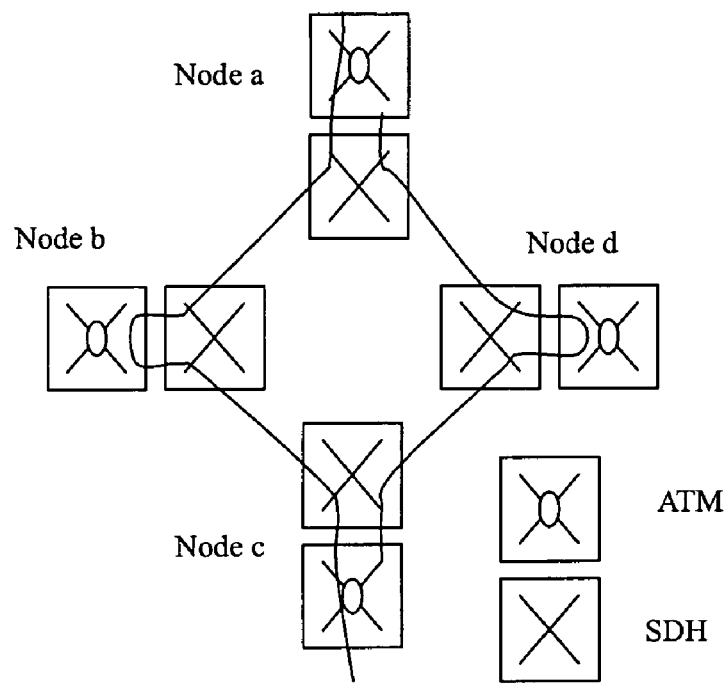
FIG. 1 is a scheme drawing for operating service protection by prior art in the multi-layer network service when the network functions well.
Figure 2:
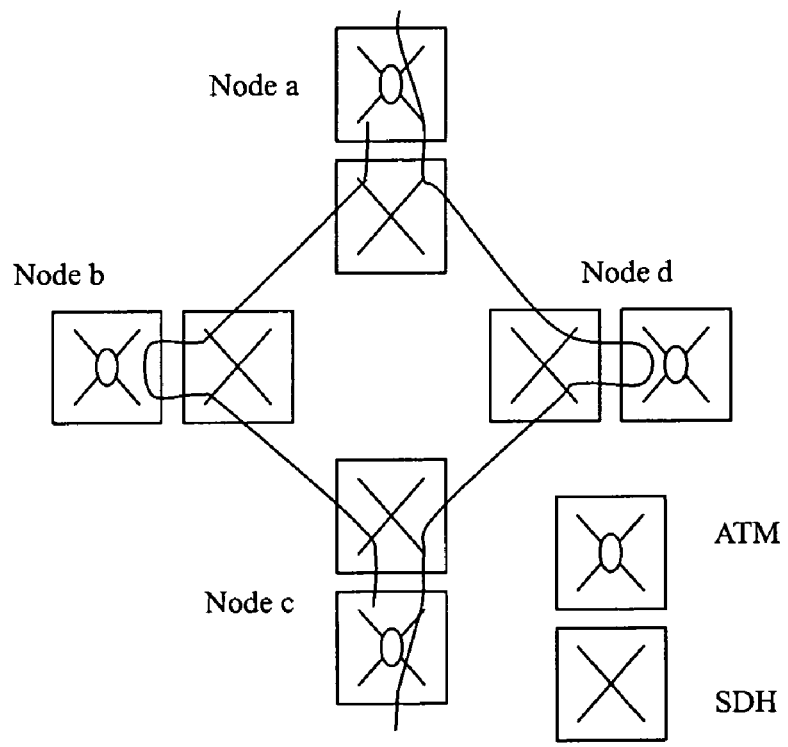
FIG. 2 is a scheme drawing for operating service protection by prior art in the multi-layer network service when the working passage malfunctions.

The protection methods in prior art are shown as FIG. 1 and FIG. 2. In the MSPP, ATM process modules are connected into rings through SDH passages provided by SDH process modules. Meanwhile, any two points on the ring can divide the whole ring into two dual-links, respectively working link and protection link according to the two nodes. When the working link or the inner node of the working link encounters trouble, the service between the two nodes will lean on protection link.

FIG. 1 is a scheme drawing when networks functions well, wherein node a, b, c, d form a ring and SDH process module of each node in the ring provides SDH dual-ring for ATM traffic. When taking the service of ATM process module of node a and node c into consideration, node a and node c provide protection link for the ATM traffic around said node by the means of 1+1 protection method or 1:1 protection method, while node b and node d provide transparent virtual path VP cross connection. When link through node d is working passage, the link through node b is protection passage, service flow passes working passage and the protection passage is regard as an alternative passage.

FIG. 2 is a scheme drawing for operating service protection by prior art in the multi-layer network service when the working passage malfunctions, wherein node a, b, c, d form a ring and the SDH process module provides SDH dual-ring for the ATM traffic. When taking the service of ATM process module of node a and node c into consideration, if the working passage passing node a encounters trouble, the service around node a and c will lean on protection passage. Furthermore, the service of other nodes in the ring has the similar service to be protected by relevant nodes around, and when working passage malfunctions, service flow will lean on protection passage.

The service shown in FIG. 2 needs SDH passage ring of two different directions. When the node at one spot gets trouble, each influenced node should be protecting at the same time, then more resource is needed, for example for SDH passage ring of two different directions, and it is difficult to operate.

Figure 3:
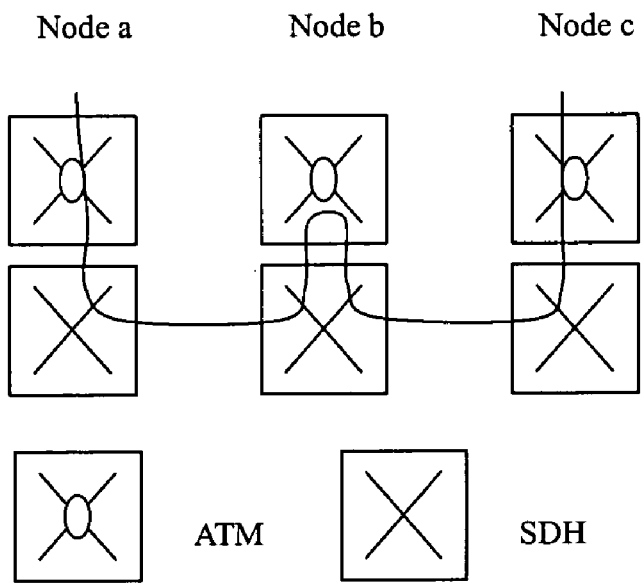
FIG. 3 is a scheme drawing for operating service protection by present invention in the multi-layer network service when the device functions well.
Figure 4:
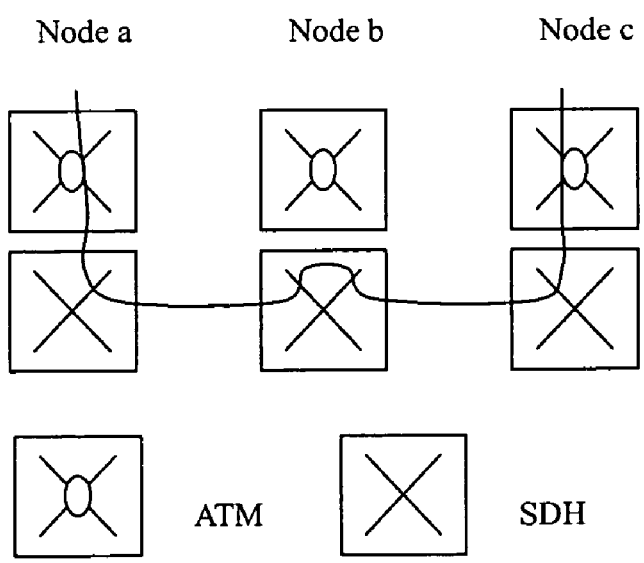
FIG. 4 is a scheme drawing for operating service protection by present invention in the multi-layer network service when the high-layer process module malfunctions.

The method of protecting ATM traffic in the present invention is shown in FIGS. 3 and 4. In MSPP MSPP, ATM processing module of each node is connected with SDH passage provided by SDH processing module. If ATM processing module of certain node gets trouble, one connection is set up by SDH processing module of this node, to directly connect two ends of the said ATM processing module's SDH passage and isolate the said ATM processing module. Because transparent VP cross connection which will not change VPI/VCI is adopted, ATM processing module of intermediate node will not change ATM connection cell's content between other nodes on sub-network. If the present invention service protecting method is adopted, other service will not be influenced except the service relevant to the trouble ATM node is influenced.

As FIG. 3 depicts, when net is normal, node a, b and c is in the same sub-network, SDH processing module of sub-network node provides ATM traffic with SDH passage connection, ATM processing module extracts and inserts ATM traffic of the said node from SDH passage. Considering ATM processing module's service of node a and node c, ATM processing module of node a and node c sets up normal ATM connection for it. ATM processing module of node b also sets up transparent VP cross connection for ATM processing module's service of node a and node c, besides setting up normal ATM connection for local up and down service. So that although ATM traffic between node a and node c pass ATM processing module of node b, the service content doesn't change.

In FIG. 4, when ATM processing module of node b get troubles, the connection between ATM processing module of node b and two SDH passages is disconnected, and the other end of two SDH passages disconnected is directly connected by SDH processing module, so that ATM traffic between node a and node c will not be processed by ATM processing module at node b. At that time although local ATM traffic of node b has already been lost, ATM traffic between node a and node c is directly connected by SDH passage at node b, so the service content is not changed.

The advantage of the present invention is that there is no need to occupy too much resource and extra SDH passage, it can be operated easily. The service protecting operation can be accomplished at the node where ATM processing module gets trouble, and it also can be used of protecting passing service in the case of device maintenance. On the other hand, only the service of nodes which gets trouble can be influenced, it is suitable for protecting service when there are troubles with multiple nodes. Of course, the present invention can be also applied in other multi-layer communication equipment for protecting high layer (corresponding to ATM layer herein) service by low layer (corresponding to SDH layer herein) bypass connection.

At last there needs to explain that the above examples is only used of illustrating the technical method in the present invention, not for limitation. Although the present invention is illustrated in detail by the preferred embodiment, it is understandable by the skilled technical persons in the art that the technical method in the present invention can be modified or identically replaced not beyond the spirit and scope of the present invention technical method, all of which should be included in the range of the present claims.

The invention claimed is:

1. A method for protecting high layer service in a multi-layer communication equipment of a communication network, comprising the following process:

first, a low layer processing module provides a high layer processing module with a low layer transmission passage;

second, the high layer processing module extracts and inserts high layer service of the multilayer communication equipment from the low layer transmission passage, avoiding changing the service between upstream node and downstream node after passing the high layer processing module of the multi-layer communication equipment;

third, when the high layer processing module detecting said high layer processing module encountering a trouble, it will inform the low layer processing module;

fourth, when the low layer processing module detecting that the high layer processing module encounters the trouble, the low layer transmission passage between the low layer processing module and the high layer processing module is broken, and the low layer processing module connects the broken passage to set up a bypass without checking whether the lower layer processing module encounters a trouble, so as to isolate the high layer processing module encountering a trouble.

2. A method for protecting high layer service in a multi-layer communication equipment according to claim 1, wherein in the second step, a transparent virtual path connection is set up for the service passing the high layer processing module of the said node, namely for ATM traffic, a cross connection, which changes neither virtual path identification nor virtual channel identification, will be set up, to avoid changing the service between upstream node and downstream node after passing high layer processing module of the said node.

3. A method for protecting high layer service in a multi-layer communication equipment according to claim 1, wherein in the third step, when the high layer processing module detects the high layer module encountering trouble, it will inform the low layer processing module by soft messages or hardware signals.

4. A method for protecting high layer service in a multi-layer communication equipment according to claim 1, wherein in the fourth step, said situation that low layer processing module detect high layer processing module encountering trouble further comprising: low layer processing module judges whether the service signal transmitting by high layer processing module is invalid or not, or low layer processing module detects the hardware signals or soft messages sending by high layer processing module indicating its invalidation.

5. A method for protecting high layer service in a multi-layer communication equipment according to claim 4, wherein said bypass connection is actual connection of the physical lines, or it is a logical connection within the low layer processing module.

6. A method for protecting high layer service in a multi-layer communication equipment according to claim 1, wherein said bypass is actual connection of a physical line.

7. A method for protecting high layer service in a multi-layer communication equipment according to claim 1, wherein the low layer processing module is a SDH processing module and the high layer processing module is an ATM processing module.

8. A method for protecting high layer service in a multi-layer communication equipment according to claim 1, wherein said bypass is logical connection within the low layer processing module.

* * * * *